United States Patent
Watanabe et al.

(10) Patent No.: US 8,293,561 B2
(45) Date of Patent: Oct. 23, 2012

(54) IMAGE PICKUP DEVICE AND IMAGE PICKUP SYSTEM

(75) Inventors: Takanori Watanabe, Yamato (JP); Tetsuya Itano, Zama (JP); Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/442,235

(22) Filed: Apr. 9, 2012

(65) Prior Publication Data

US 2012/0194724 A1 Aug. 2, 2012

Related U.S. Application Data

(62) Division of application No. 12/481,008, filed on Jun. 9, 2009, now Pat. No. 8,173,476, which is a division of application No. 11/446,119, filed on Jun. 5, 2006, now Pat. No. 7,569,868.

(30) Foreign Application Priority Data

Jun. 9, 2005 (JP) ................................. 2005-169780
May 26, 2006 (JP) ................................. 2006-146796

(51) Int. Cl.
*H04N 5/335* (2011.01)
(52) U.S. Cl. ...... 438/60; 438/75; 438/144; 257/E27.082; 257/E27.083; 257/E27.15; 257/E27.163; 257/E29.065; 257/E29.227
(58) Field of Classification Search ............. 438/60, 438/75, 144; 257/E27.082, E27.083, E27.15, 257/E27.163, E29.065
See application file for complete search history.

(56) References Cited

U.S. PATENT DOCUMENTS

| | | | |
|---|---|---|---|
| 6,175,383 B1 | 1/2001 | Yadid-Pecht et al. | |
| 6,885,047 B2 | 4/2005 | Shinohara et al. | |
| 6,956,606 B2 | 10/2005 | Mabuchi | |
| 6,963,367 B1 | 11/2005 | Hashimoto | |
| 6,963,371 B2 | 11/2005 | Sakurai et al. | |
| 6,992,714 B1 | 1/2006 | Hashimoto et al. | |
| 7,139,028 B2 | 11/2006 | Itano et al. | |
| 7,151,567 B2 | 12/2006 | Suzuki et al. | |
| 7,227,206 B2 | 6/2007 | Watanabe | |
| 7,639,296 B2 | 12/2009 | Mabuchi | |
| 2002/0032545 A1 | 3/2002 | Mabuchi | |
| 2003/0011831 A1 | 1/2003 | Sakurai et al. | |
| 2003/0137594 A1 | 7/2003 | Koizumi et al. | |
| 2003/0206234 A1 | 11/2003 | Sakurai et al. | |
| 2004/0057719 A1 | 3/2004 | Ogura et al. | |
| 2004/0085465 A1 | 5/2004 | Inui et al. | |
| 2004/0155973 A1* | 8/2004 | Bea et al. ................ | 348/308 |
| 2005/0243193 A1* | 11/2005 | Gove et al. .............. | 348/241 |
| 2006/0103748 A1 | 5/2006 | Mabuchi | |
| 2006/0124977 A1 | 6/2006 | Shinohara et al. | |

(Continued)

FOREIGN PATENT DOCUMENTS

JP 11-112018 A 4/1999

(Continued)

*Primary Examiner* — Marc Armand
(74) *Attorney, Agent, or Firm* — Fitzpatrick, Cella, Harper & Scinto

(57) ABSTRACT

There is provided an image pickup device, including a photoelectric conversion element converting light into charges, a transfer gate for transferring the converted charges to a floating node, a source follower transistor for outputting a signal based on a voltage of the floating node to a signal line, and a clip circuit clipping the signal line at a first voltage and a second voltage.

10 Claims, 7 Drawing Sheets

U.S. PATENT DOCUMENTS

2006/0268140 A1 11/2006 Forbes et al.
2008/0012976 A1 1/2008 Sakurai et al.

FOREIGN PATENT DOCUMENTS

| JP | 2000-287131 A | 10/2000 |
| JP | 2001-24949 A | 1/2001 |
| JP | 2001-230974 A | 8/2001 |
| JP | 2002-51263 A | 2/2002 |
| JP | 2003-32548 A | 1/2003 |
| JP | 2004-165992 A | 6/2004 |
| JP | 2004-222273 A | 8/2004 |
| JP | 2005-57612 A | 3/2005 |
| JP | 2005-341509 A | 12/2005 |

* cited by examiner

IMAGE PICKUP DEVICE AND IMAGE PICKUP SYSTEM

CROSS REFERENCE TO RELATED APPLICATION

This application is a divisional of U.S. application Ser. No. 12/481,008, filed Jun. 9, 2009, now U.S. Pat. No. 8,173,476 which is a divisional of U.S. application Ser. No. 11/446,119, filed Jun. 5, 2006, now U.S. Pat. No. 7,569,868.

BACKGROUND OF THE INVENTION

1. Field of the Invention

The present invention relates to an image pickup device and an image pickup system.

2. Description of Related Art

In recent years, a higher-image quality inexpensive digital camera has become popular owing to a progress in the performance of the image pickup device. In particular, a CMOS sensor, which has an active element in each pixel and peripheral circuitry on the chip, has remarkably improved its performance, and as a result, CCD sensors have partially been replaced by CMOS sensors. The CMOS sensor has an active element for converting electric charges into an optical signal output in each pixel. The threshold variation of each pixel, and kTC noise (thermal noise) at a time of resetting causes fixed pattern image noise and random image noise. For removing these types of noise, correlated double sampling (CDS) for reading only image signals by acquiring a the difference between a reset noise output after resetting and an output after a charge transfer has been proposed.

In the following passage, a problem at the time of performing photography using a CMOS sensor performing the CDS is described. When a very bright light source is photographed in a photographing region, strong light irradiates the electric charge conversion part of the CCD sensor. Consequently, the reset noise output varies owing to the light, and the dynamic range of the active circuit is suppressed. As a result, the image signal of the pixel irradiated by the strong light is reduced (hereinafter this phenomenon is referred to as an image signal reduction at the time of a large quantity of light). For example, when the sun is photographed, the center part of the sun becomes a black point and becomes an unnatural image. This problem is solvable when taking a still image by providing a mechanical shutter. However, in a movie, because the use of the mechanical shutter is disadvantageous for securing an adequate exposure time and a frame speed, a mechanical shutter is not often used to solve this problem. Moreover, because an inexpensive camera frequently omits the mechanical shutter, the problem also occurs even at the time of photographing a still image. In view of such problems, a method of suppressing the optical signal output reduction at the time an image containing a large quantity of light is incident on an image pickup device has been proposed.

Japanese Patent Application Laid-Open No. 2000-287131 proposes a method of detecting an output variation at a time of reading a reset noise to write a predetermined value as a reset noise output when the output variation is judged to be caused by a large light quantity. According to the proposal, at the time of reading an output after a charge transfer, an image signal output reduction prevention circuit is in a cutoff state at the time of receipt of the large light quantity, and does not especially affect an image.

However, the image region other than the pixel which is irradiated by a strong light with a large light quantity is sometimes influenced by the light. FIG. 3 is an explanatory diagram of a CMOS sensor. Each of reference numerals 301 to 303 denotes a unit pixel cell, and is arranged in two dimensions. Reference numerals 304 and 305 denote constant current sources provided to each column The constant current sources 304 and 305 constitute source follower amplifiers together with the source follower transistors in the pixel cells 301 to 303. A common gate voltage 307 is given to the constant current sources 304 and 305, and a common power source wiring 306 is connected to the constant current sources 304 and 305. A signal of each of the pixels 301 to 303 is read from output terminals 308 and 309 at each row.

When a strong light having an intensity equal to or more than a saturated output irradiates the pixel 302, the voltage of the output terminal 308 falls, and it deviates from the working range the constant current source 304. As a result, a predetermined current is led not to flow through the constant current source 304, and the current quantity flowing through the power source wiring 306 decreases. The constant current sources 305 of the other columns are influenced by the variation of the current, and the voltages of the output terminals 309 are varied to influence the image.

The influence is described with reference to the schematic view of FIG. 4 at the time of a window chart image pickup. A reference numeral 401 denotes a dark output region or not saturated output region, and the dark output region 401 corresponds to the pixels 301 of FIG. 3. A light having an intensity equal to or more than the saturated output irradiates a region 402 corresponding to the pixel 302 of FIG. 3. A reference numeral 403 denotes regions that are irradiated by the same light as that irradiating the regions 401, and the regions 403 correspond to the regions 303 of FIG. 3. An image shaped in a stripe in a lateral direction in the regions 403 is formed under the influence of the saturated region 402.

SUMMARY OF THE INVENTION

An image pickup device according to the present invention comprises a plurality of pixels, each including a photoelectric conversion element converting light into charges, a transfer gate for transferring the converted charges to a floating node, a first transistor for outputting a signal based on a voltage of the floating node to a signal line, and a second transistor for resetting the voltage of the floating node; a constant current source supplying a current from drain to source of the first transistor, and a clipping circuit capable of limiting the signal line at a first voltage and a second voltage different from the first voltage.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS (First Embodiment)

Figure 1:
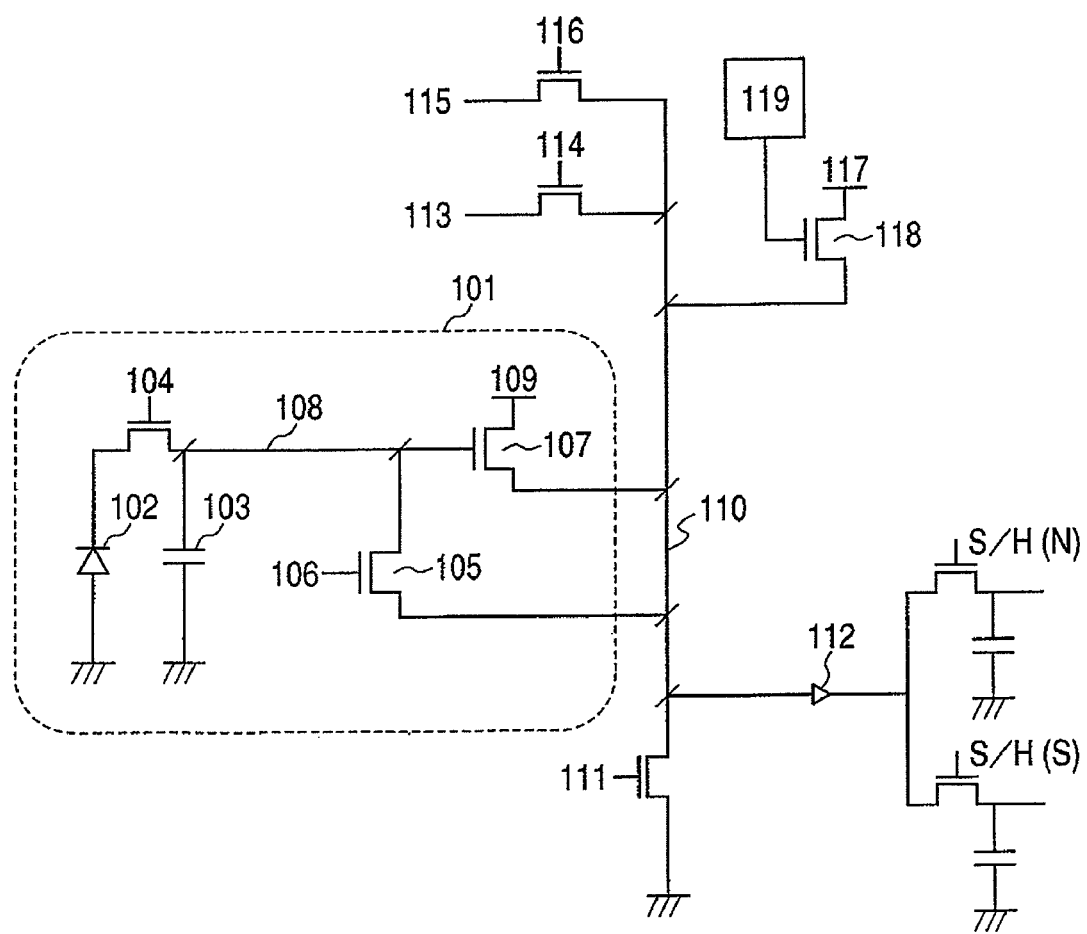
FIG. 1 is a circuit diagram of an image pickup device according to a first embodiment.
Figure 2:
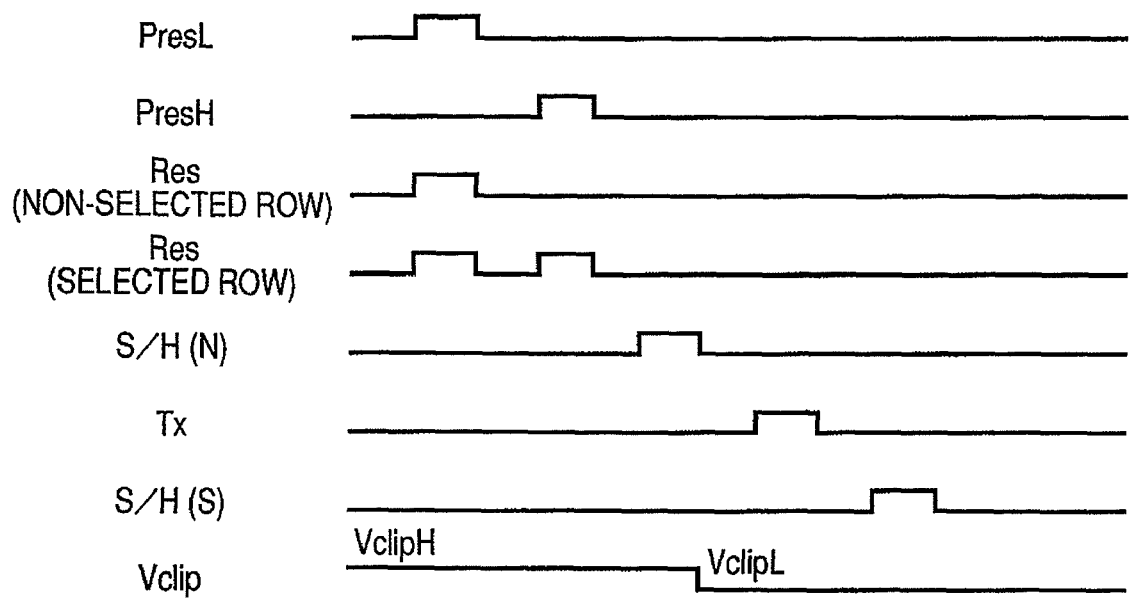
FIG. 2 is an explanatory diagram of drive pulses of the image pickup device according to the first embodiment.
Figure 3:
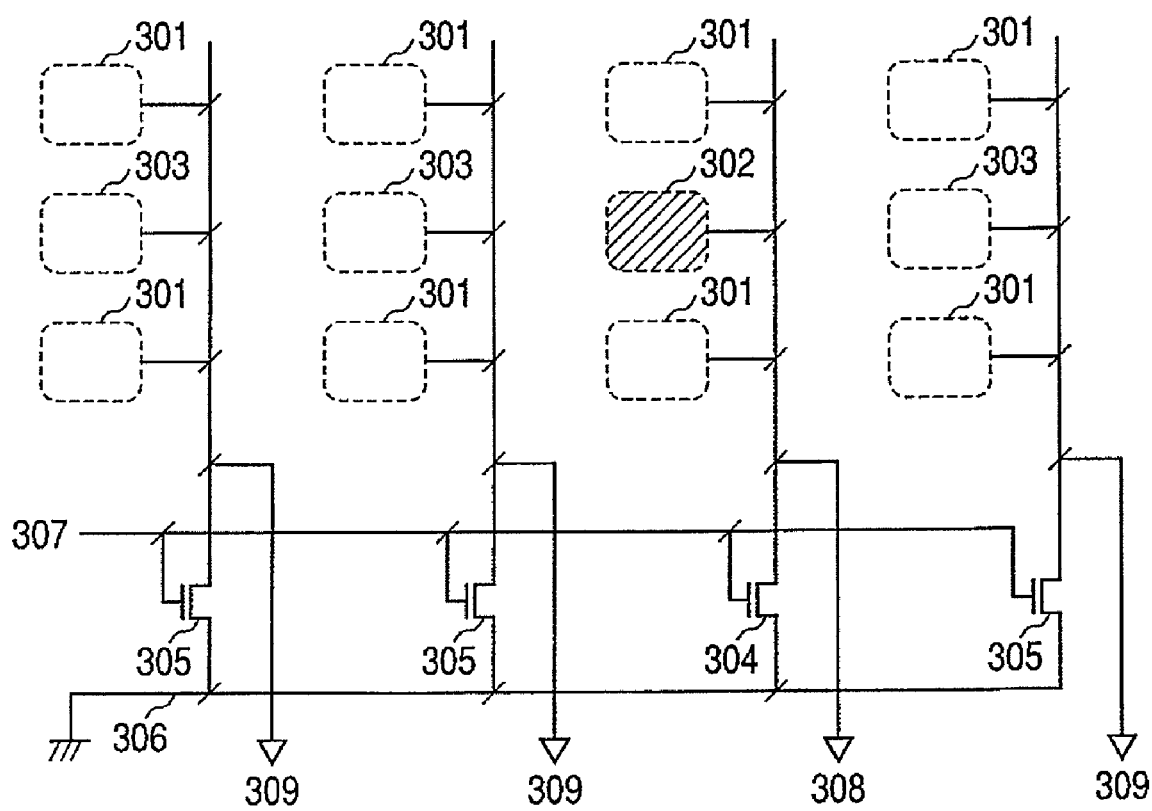
FIG. 3 is an explanatory diagram of a CMOS sensor.
Figure 4:
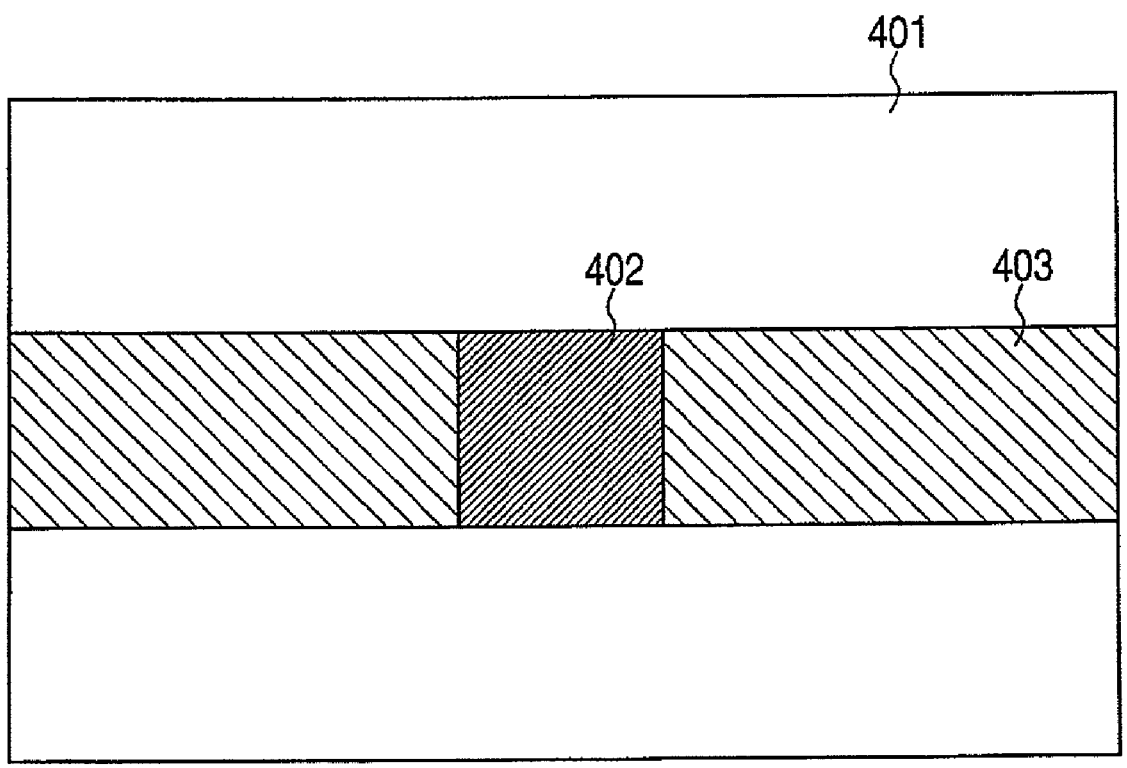
FIG. 4 a schematic view at the time of a window chart image pickup.

FIG. 1 is a circuit diagram of an image pickup device according to a first embodiment, and FIG. 2 shows the drive pulses thereof. Although a case where an electron is used as a charge and the transistors are N channel MOS transistors (NMOS's) is described here, it is possible to obtain the advantages of the present embodiment also in the case where the types of the transistors and the polarities of pulses are inverted. A reference numeral 101 denotes a unit pixel cell. The unit pixel cells are repeatedly arranged in two dimensions, although the showing of them is omitted in the diagram. Hereinafter, a unit pixel is referred as a pixel. In the present embodiment, the pixel cell 101 employs a three-transistor system, and is configured not to include any selection transistors in the pixel cell 101.

The pixel cell 101 is concretely composed of a photodiode 102, a floating capacity 103, a transfer gate 104, a source follower transistor 107 and a reset transistor 105. The gate of the source follower transistor 107 is connected to a floating node 108, and the drain thereof is connected to a power source 109. The source of the reset transistor 105 is connected to the floating node 108, and the reset transistor 105 is controlled by the reset gate 106. The photodiode 102 converts a received light into charges by photoelectric conversion, and stores the converted charges. The charges are also called photocharges. A plurality of pixel cells 101 is connected to a vertical signal line 110.

The drain of the reset transistor 105 and the source of the source follower transistor 107 are connected to the vertical signal line 110. The vertical signal line 110 is connected to a constant current source 111. The constant current source 111 supplies a current from drain to source of the source follower transistor 105. And a source follower operates. The source follower transistor 107 outputs the voltage of the floating node 108 to the vertical signal line 110. Then, the voltage of the vertical signal line 110 is read from the output terminal 112.

The output is held at a sample hold circuit S/H(N). The present embodiment includes two sample hold circuits denoted by reference characters S/H(N) and S/H(S), respectively, in FIG. 1. In the sample hold circuit S/H(N), a reset signal (hereinafter referred to as an N signal) based on the voltage of the floating node 108 at the time of resetting the floating node 108, is held. In the sample hold circuit S/H(S), a signal (hereinafter referred to as an S signal) based on the voltage of the floating node 108 at the time of transferring the charges of the photodiode 102 is held.

Herein, a period of reading and holding a signal based on a voltage of the floating node at the time of reset of the floating node is referred to as a reset signal reading period. And, a period of reading and holding a signal based on a voltage of the floating node at the time of transferring the charge from the photoelectric conversion element to the floating node is referred to as a photoelectric conversion signal reading period.

Hereupon, the S signal is a signal including the N signal and a signal based on the charges transferred from a photodiode. Accordingly, as described above, it becomes possible to acquire an image signal by operating the difference between the S signal and the N signal.

A row selection is performed by controlling the voltage of the floating node 108.

To put it concretely, the row selection is controlled by a voltage VresL113 supplied from a transistor 114 and a voltage VresH115 supplied from a transistor 116, both the transistors 114 and 116 being connected to the vertical signal line 110. The voltage VresH115 is higher than the voltage VresL113. These voltages VresH115 and VresL113 are hereinafter referred to as reset voltages.

The driving is concretely described. The transistors 114 connected to the vertical signal lines 110 are turned on. Then, the reset transistors 105 of all of non-selected rows and a selected row are turned on at the same time as the low reset voltage VresL113 is written in the vertical signal lines 110. By this operation, the vertical signal lines 110 and the floating nodes 108 of all of the pixels are reset at the lower voltage VresL113.

Next, only the reset transistor 105 of a row to be desired to be selected, i.e. only the reset transistor 105 of a certain column, is made to be in a state of being turned on, and the transistors 114 are turned off. After that, the transistor 116 of the column is turned on. By this operation, the high reset voltage VresH115 is written in the floating node 108 of the pixel to be desired to be selected. That is, the voltage of the floating node 108 is made to be the reset voltage VresH115 by turning on the transistor 116 and the reset transistor 105.

Furthermore, the vertical signal line 110 is operated as a source follower by turning off the transistor 116. Although a plurality of source follower transistors 107 is connected to the same vertical signal line 110 at this time, only the source follower of the highest voltage, i.e. the source follower at the selected row in which the higher reset voltage VresH115 is written, becomes effective, and a signal depending on the floating node voltage of the selected row is output to the output terminal 112.

The driving is described with reference to the timing chart of FIG. 2.

A reference character PresL denotes a pulse supplied to the gates of the transistors 114. A reference character PresH denotes a pulse supplied to the gates of the transistors 116. A reference character Res (NON-SELECTED ROW) denotes a pulse supplied to the gates of the reset transistors 105 of non-selected rows, and a reference character Res (SELECTED ROW) denotes pulses supplied to the gates of the reset transistors 105 of a selected row. A pulse marked by the reference character S/H(N) is a pulse at the time of performing the sample hold of the N signal, and a reference numeral Tx denotes a pulse supplied to the transfer gate 104 in the pixel cell 101. A pulse marked by the reference character S/H(S) is a pulse at the time of performing the sample hold of the S signal. A reference character Vclip will be described later.

First, the sample hold circuit S/H(N) (FIG. 1) performs the sample hold of the N signal of the selected row, in which the high reset voltage VresH115 is written, which is read by the method described above, at the timing of the signal S/H(N). Next, the photocharges from the photodiode 102 are transferred to the floating node 108 at the timing indicated by the reference character Tx. After that, the sample hold circuit S/H(S) (FIG. 1) performs the sample hold of the voltage of the output terminal 112, i.e. S signal, at the timing of the signal S/H(S). Then, an image signal according to an incident light is read by operating on the difference between the S signal and the N signal, although the component for the operation is not shown in FIG. 1.

Hereupon, a clip circuit is provided to each of the vertical signal lines 110. This operation of the clip circuit is to limit, within a predetermined range, the voltage of the signal line exceeding the predetermined range. This voltage of the predetermined range may be a voltage level determined based on, for example an image signal, a dynamic range or the like of the constant current source. The clip circuit in the present embodiment includes a clip transistor 118, a power source 117 and switching means 119. A clip voltage Vclip (FIG. 2) is applied to the gate of the transistor 118. The clip circuit is capable of switching the voltage of the signal line by means of the gate voltage of the transistor 118. It is possible to make the power source 117 output the same voltage as that of the power source 109 of the source follower transistor 107 of the pixel cell 101. Moreover, it is preferable to make the size of the clip transistor 118 be the same as that of the source follower transistor 107 of the pixel cell 101.

In the present embodiment, the voltage of the clip voltage Vclip is given as a pulse shown in FIG. 2. By the switching means 119, a voltage VclipH is given at the time of reading the N signal, and a voltage VclipL is given at the time of reading the S signal. The clip transistor 118 supplies a first voltage VclipH' to the vertical signal line 110 when the voltage given to the gate of the clip transistor 118 is the voltage VclipH, and supplies a second voltage VclipL' to the vertical signal line 110 when the voltage given to the gate is the voltage VclipL.

That is, during a period of at least a part of the reset signal reading period, the voltage of the signal line is limited to the first voltage VclipH'. And, during a period of at least a part of the photoelectric conversion signal reading period, the voltage of the signal line is limited to the second voltage VclipL'.

Because the S signal is clipped by the voltage VclipL' in case of the light quantity equal to or more than the saturated output, the voltage of the vertical signal line 110 does not fall too much. At this time, the voltage VclipL' is set to be higher than the voltage at which the constant current source 111 is turned off. Consequently, because a current continues to flow in the constant current source 111, it is possible to suppress the generation of a lateral stripe.

Moreover, according to the present embodiment, for example, even when a very bright subject such as the sun has been photographed, namely, even when the voltage of the floating node 108 has been significantly changed in a period from a reset of the floating node 108 to a reading of a reset noise, the voltage of the reset noise output does not fall to a voltage smaller than the voltage VclipH' regulated by the voltage VclipH. As a result, VclipL' may be determined based on the dynamic range or the like of the image signal after CDS. Then, because the voltage VclipL' regulated by the voltage VclipL is output to the output terminal 112 similarly at the time of the usual saturation at the time of the signal output after a charge transfer, the image signal Vsig is expressed by the following formula.

$V\text{sig}=|V\text{clip}L'-V\text{clip}H'|$

As a result, a constant image signal output can be acquired at the time of receipt of the large quantity of light.

As described above, the clip transistor 118 supplies the first voltage VclipH' to the vertical signal line 110 when the sample hold of a N signal is performed by the sample hold circuit S/H(N), and supplies the second voltage VclipL' to the vertical signal line 110 when the sample hold of a S signal is performed by the sample hold circuit S/H(S). The first voltage VclipH' and the second voltage VclipL' are voltages different from each other. It is preferable that the first voltage VclipH' is higher than the second voltage VclipL'.

By the above, it is possible to reduce the fall of the voltage of the signal line at the time of outputting a N signal to a voltage smaller than the voltage VclipH', and to reduce the fall of the image signal output at the time of the large light quantity. Moreover, the influences to the outputs of the other pixel cells can be suppressed by supplying voltage VclipL' at the time of the s signal.

Consequently, it becomes possible to make it difficult to generate the image signal output decrease at the time of a large light quantity, and it also becomes possible to make it difficult to form an image of a stripe at the pixels other than a saturated pixel at the time of receipt of the large light quantity.

Moreover, by the voltage relation between the first voltage VclipH' and the second voltage VclipL', it becomes possible to make it difficult to generate a decrease of the image signal output, which is sometimes generated at a pixel on which a strong light is irradiated even if the brightness thereof is equal to or smaller than the level at which a saturated output is output, and it also becomes possible to make it difficult to generate a stripe when a light having the light quantity is equal to or more than a saturated light quantity.

Moreover, in the present embodiment, the switching means 119 performs the clipping by the two voltages from the transistor 118. For example, two groups, each consisting of the transistor 118 and the power source 117 like the present embodiment, are provided. Hereupon, voltages different from each other are supplied from the two power sources, and the switching means 119 switches on and off of the transistors. Thereby, clipping using different voltages can be performed. As described above, the clip circuit is not limited to the circuit configuration of the present embodiment.

(Second Embodiment)

Suitable bias conditions are described as a second embodiment. It is assumed that a voltage at which the constant current source 111 begins not to perform its normal operation owing to the excessive falling of the voltage of the output terminal 112 is denoted by a reference character Vlimit, and that a range of capturing an image signal (the difference between S signal and N signal), namely the saturation range of the capture of an analog/digital (A/D) converter 6 (FIG. 5) at a subsequent stage, is denoted by a reference character Vrange. The A/D converter 6 converts the voltage output through the output terminal 112 from an analog signal into a digital signal.

$V\text{limit}>V\text{clip}L'$ $V\text{sig}=V\text{clip}L'-V\text{clip}H'$ $|V\text{sig}|>|V\text{range}|$ That is, the difference Vsig between the first voltage VclipH' and the second voltage VclipL' is larger than the saturation range of the A/D converter.

Furthermore, the relations between light quantities and output voltages are described with reference to a diagram showing the relations schematically in FIG. 7. For simplification, it is supposed that the direction indicated by the arrow of the ordinate axis indicating the voltages is negative.

Figure 7:
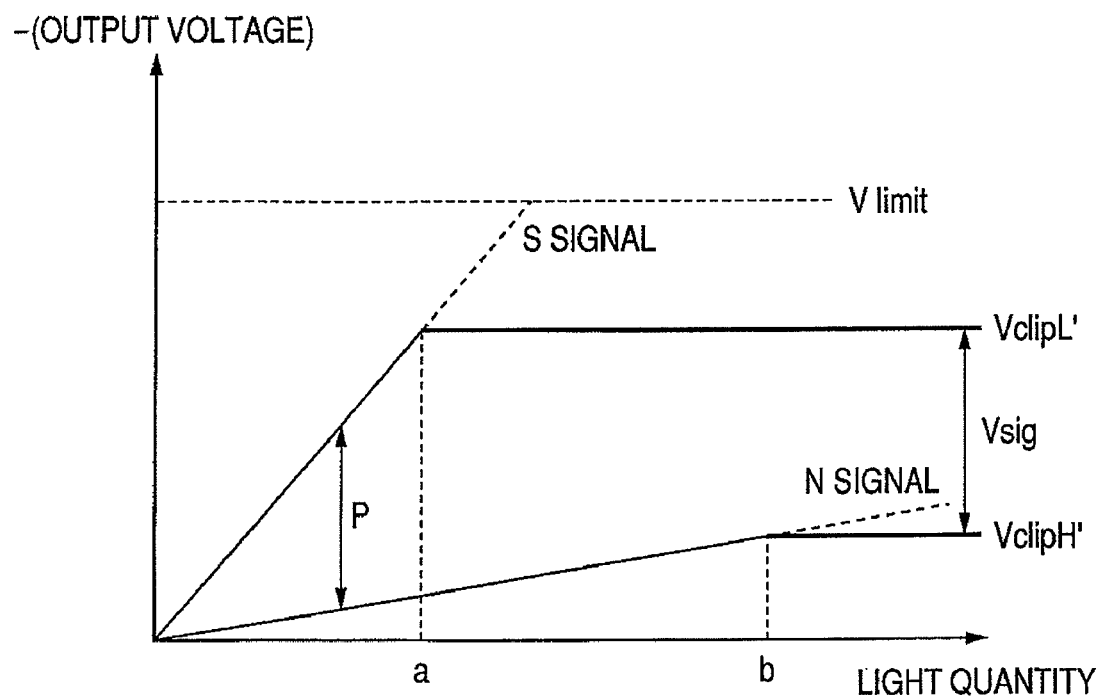
FIG. 7 is an explanatory diagram showing a second embodiment.

In FIG. 7, the S signal and the N signal increase as the light quantity increases. The S signal and the N signal severally have an inclination different from each other. Then, the N signal is clipped at the first voltage VclipH', and the S signal is clipped at the second voltage VclipL'. The situation is shown with the solid lines and the dotted lines, and it is supposed that the light quantities at the time of starting the clippings are denoted by reference characters a and b, respectively. And the voltage Vlimit is expressed by a dotted line.

Hereupon, the difference Vsig between the S signal and the N signal is an image signal. In FIG. 7, a reference character P denotes the image signal. The image signal should usually increase at a fixed rate with respect to the quantity of incident light. However, the image signal P decreases between the light quantities a and b.

Accordingly, in the present embodiment, what is necessary is just to make the difference Vsig, larger than the saturation range Vrange of the A/D converter 6. By means of setting the image pickup device to meet such a condition, an adverse effect on the image signal due to a variation of the voltages of the vertical signal lines caused by the plurality of the clip circuits can be avoided.

By setting the image pickup device to fulfill such a condition, it is possible to reduce the generation of a stripe image, and to reduce the decrease of the image signal at the time a large light quantity is incident on the image pickup device, and further, it is made possible to reduce the variation of the image signal and then to produce a high quality image signal. And, a single A/D converter may be arranged in the image pickup device. And, also a plurality of the A/D converters may be arranged in the image pickup device. For example, the A/D converters may be arranged per each of the vertical signal lines 110. In this case, the signal reading speed can be improved. And, by means of converting the analog signal from the pixel into a digital signal, loss in transmitting and an adverse effect due to the noise can be reduced.

(Third Embodiment)

Figure 5:
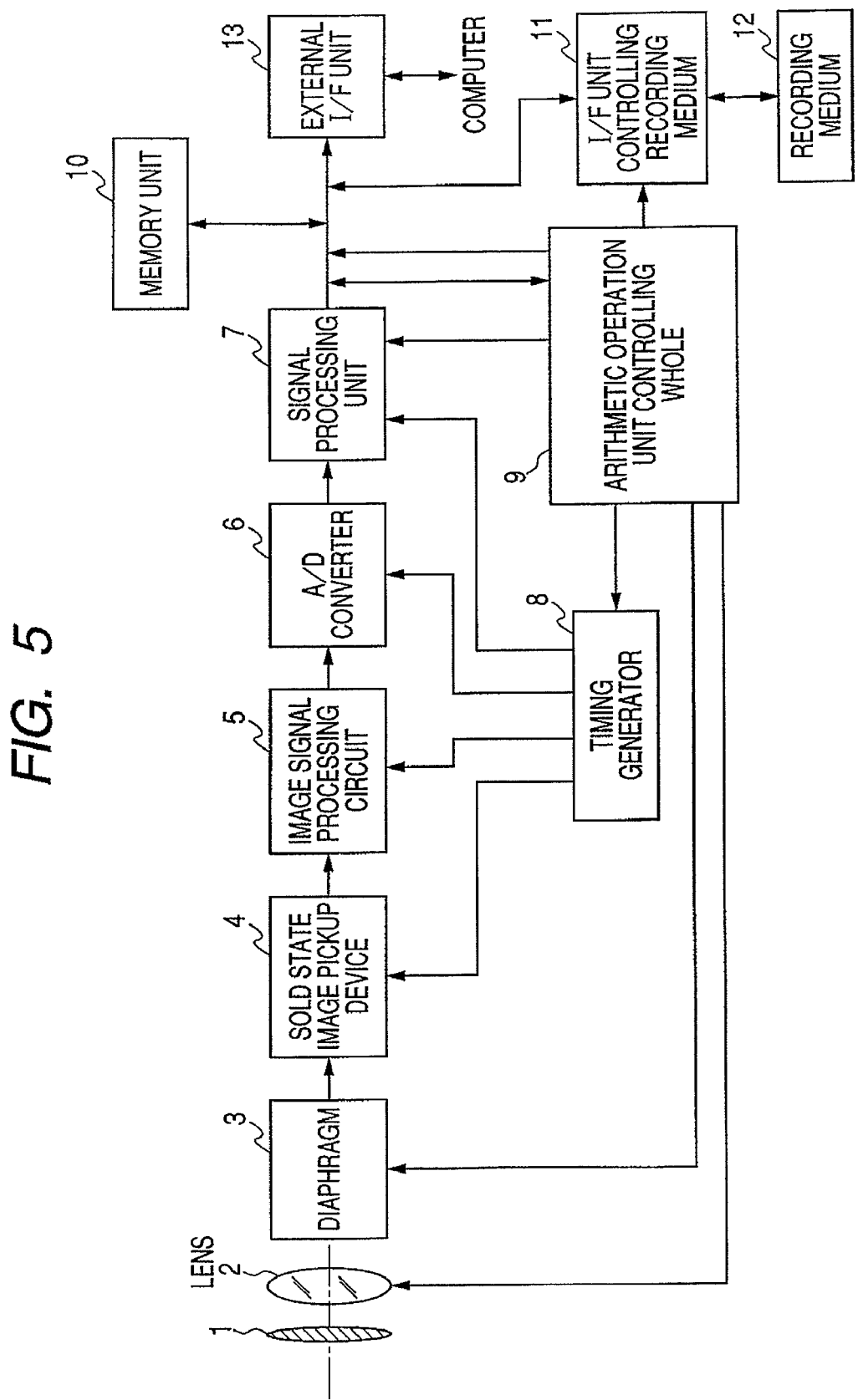
FIG. 5 is a block diagram showing an example of the configuration of a still video camera according to a third embodiment.

An example of applying the image pickup device to an image pickup system is shown below. With reference to FIG. 5, a case where the image pickup device is applied to a still video camera is described in detail. FIG. 5 is a block diagram showing an example of the configuration of the still video camera. The image pickup device of FIG. 1 is used as a solid state image pickup device 4.

In FIG. 5, a reference numeral 1 denotes a barrier commonly used as a protector of a lens and a main switch. A reference numeral 2 denotes the lens focusing an optical image of a subject on the solid state image pickup device 4. A reference numeral 3 denotes a diaphragm for varying the light quantity of the light passing through the lens 2. The reference numeral 4 denotes the image pickup device for capturing the subject focused by the lens 2 as an image signal. A reference numeral 5 denotes an image signal processing circuit performing analog signal processing of an image pickup signal (image signal) output from the image pickup device 4. The reference numeral 6 denotes the A/D converter performing the analog-to-digital conversion of an image signal output from the image signal processing circuit 5. A reference numeral 7 denotes a signal processing unit performing various corrections of image data output from the A/D converter 6 or compressing data. A reference numeral 8 denotes a timing generator outputting various timing signals to the image pickup device 4, the image signal processing circuit 5, the A/D converter 6 and the signal processing unit 7. A reference numeral 9 denotes an arithmetic-operation, entire-still-video-camera control unit for performing various operations and controlling the entire still video camera. A reference numeral 10 denotes a memory unit for temporarily storing image data. A reference numeral 11 denotes an interface unit for performing recording or reading from or to a recording medium 12. The reference numeral 12 denotes the detachably attachable recording medium, such as a semiconductor memory, for performing recording or reading of image data. A reference numeral 13 denotes an interface unit for performing communication with an external computer and the like. The image signal processing circuit 5 and the A/D converter 6 may be formed on the same semiconductor substrate as that on which the image pickup device 4 is formed, and may be formed by the same process step as that for producing the image pickup device 4.

Next, the operation of the still video camera at the time of photographing in the configuration described above is described. When the barrier 1 is opened, the main power source is turned on, and then the power source of a control system is turned on, and further the power source of image pickup system circuits such as the A/D converter 6 and the like is turned on. Then, in order to control light exposure, the arithmetic-operation, entire-still-video-camera control unit 9 makes the diaphragm 3 open, and a signal output from the image pickup device 4 is converted by the A/D converter 6 through the image signal processing circuit 5. After that, the converted signal is input into the signal processing unit 7. The arithmetic-operation, entire-still-video-camera control unit 9 performs the exposure operation based on the data. The arithmetic-operation, entire-still-video-camera control unit 9 determines the brightness based on the result of having performed the photometry, and controls the diaphragm 3 according to the result.

Next, the arithmetic-operation, entire-still-video-camera control unit 9 extracts high-frequency components based on a signal output from the image pickup device 4, and performs an operation to determine the distance to the subject. After that, the arithmetic-operation, entire-still-video-camera control unit 9 drives the lens 2 to judge whether the lens 2 is in-focus or not. When the arithmetic-operation, entire-still-video-camera control unit 9 determines that the lens 2 is not in-focus, the arithmetic-operation, entire-still-video-camera control unit 9 again drives the lens 2 to perform an operation. Then, after the ascertainment of being in-focus, main exposure starts. After the exposure has been completed, an image signal output from the image pickup device 4 is subjected to the A/D conversion by the A/D converter 6 through the image signal processing circuit 5, and passes through the signal processing unit 7 to be written in the memory unit 10 by the arithmetic-operation, entire-still-video-camera control unit 9. After that, the data stored in the memory unit 10 is recorded on the detachably attachable recording medium 12 such as a semiconductor memory or the like through the I/F unit controlling recording medium 11 by the control of the arithmetic-operation, entire-still-video-camera control unit 9. Moreover, the data may be directly input a computer or the like through the external I/F unit 13 to be subjected to the processing of the image.

Thus, according to the present embodiment, high quality still image can be provided.

(Fourth Embodiment)

Figure 6:
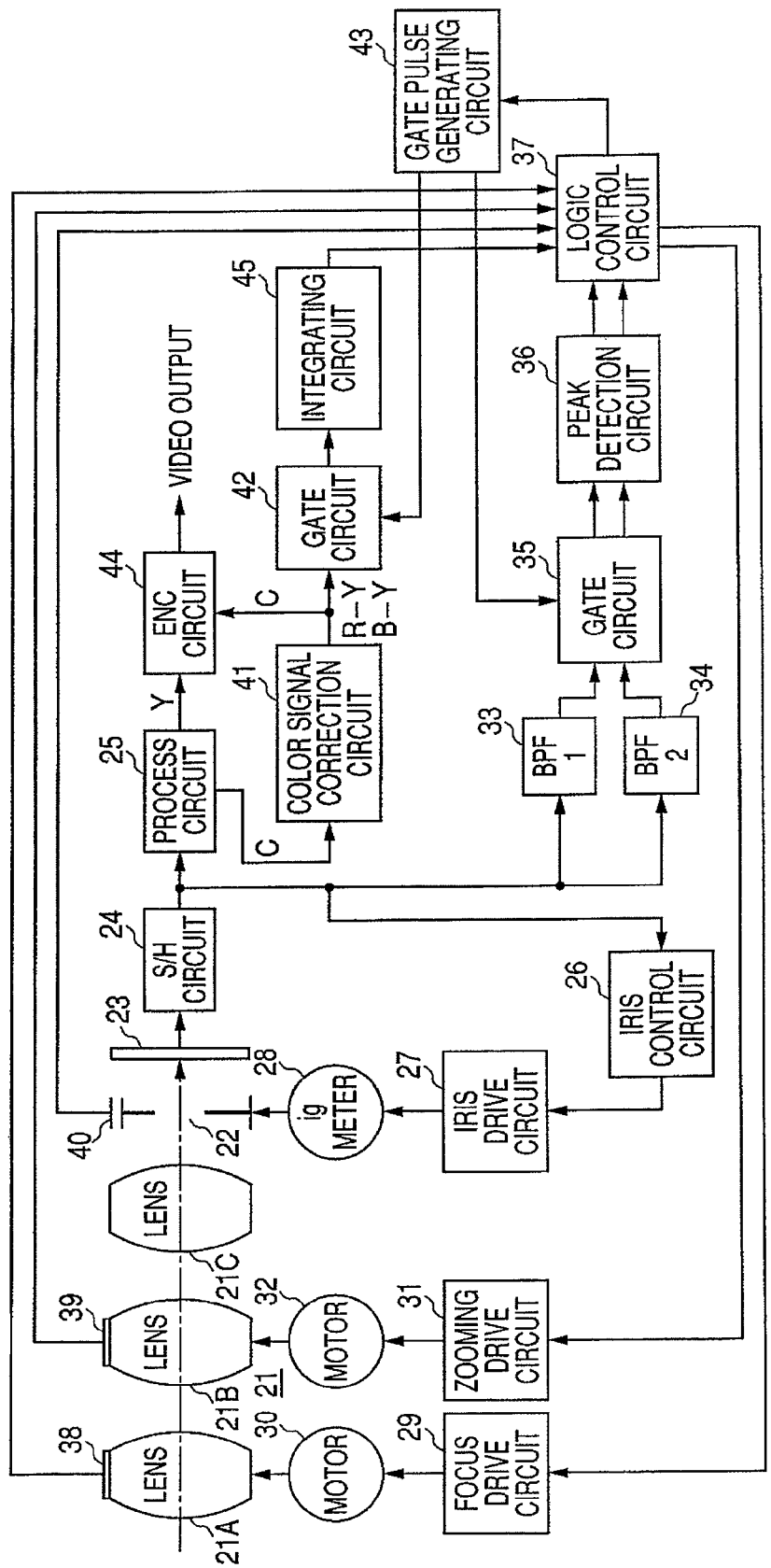
FIG. 6 is a block diagram showing an example of the configuration of a video camera according to a fourth embodiment.

An example of applying the image pickup device to another image pickup system is shown below. With reference to FIG. 6, an embodiment of the case where the image pickup device is applied to a video camera is described in detail. The solid state image pickup device of FIG. 1 is used as an image pickup device 23.

A reference numeral 21 denotes a taking lens composed of a focus lens 21A for performing focusing, a zoom lens 21B performing a zoom operation, and a lens 21C for image formation. A reference numeral 22 denotes a diaphragm and mechanical shutter. The reference numeral 23 denotes the image pickup device performing the photoelectric conversion of a subject image formed on an image pickup surface to convert the subject image into an electric image pickup signal. A reference numeral 24 denotes a sample hold circuit (S/H circuit) which performs a sample hold operation on the image pickup signal output from the image pickup device 23 and amplifies the level of the sampled image pickup signal to output an image signal.

A reference numeral 25 denotes a process circuit which performs predetermined processing of an image signal output from the sample hold circuit 24, such as gamma correction, color separation, blanking processing and the like, and outputs a luminance signal Y and a chroma signal C. The chroma signal C output from the process circuit 25 is subjected to the corrections of white balance and color balance by the color signal correction circuit 41, and is output as chrominance difference signals R-Y and B-Y.

Moreover, the luminance signal Y output from the process circuit 25 and the chrominance difference signals R-Y and B-Y output from the color signal correction circuit 41 are modulated by the encoder circuit (ENC circuit) 44 to be output as a standard television signal. Then, the standard television signal is supplied to an unillustrated video recorder or an electronic view finder such as a monitor electric view finder (EVF).

Subsequently, a reference numeral 26 denotes an iris control circuit, which controls an iris drive circuit 27 based on an image signal supplied from the sample hold circuit 24 and performs the automatic control of an ig meter 28 in order to control the opening quantity of the diaphragm 22 so that the level of an image signal may be a fixed value of a predetermined level.

Reference numerals 33 and 34 denote band pass filters (BPF) performing different band limiting for extracting high-frequency components necessary for performing in-focus detection among the image signals output from the sample hold circuit 24. The signals output from a first band pass filter 33 (BPF1) and a second band pass filter 34 (BPF2) are gated by a gate circuit 35 with a focus gate frame signal, and the peak values of the gated signals are detected by a peak detection circuit 36 to be held. The held peak values are input into a logic control circuit 37. The input signals are called focus voltages, and focusing is preformed based on the focus voltages.

Moreover, a reference numeral 38 denotes a focus encoder detecting a moved position of the focus lens 21A. A reference numeral 39 denotes a zoom encoder detecting the focus distance of the zoom lens 21B. A reference numeral 40 denotes an iris encoder detecting an opening quantity of the diaphragm 22. The detected values of these encoders 38 to 40 are supplied to the logic control circuit 37 performing system control.

The logic control circuit 37 performs in-focus detection of a subject based on an image signal corresponding to one in a set in-focus detection region to perform focusing. That is, the logic control circuit 37 captures the peak value information of the high-frequency components supplied from each of the band pass filters 33 and 34, and supplies control signals of a rotation direction, a rotation speed, a rotation/stop and the like of a focus motor 30 to a focus drive circuit 29 in order to drive the focus lens 21A to the position where the peak values of the high-frequency components become a maximum. Thus, the logic control circuit 37 controls the focus drive circuit 29.

A zooming drive circuit 31 rotates a zoom motor 32 when a zoom operation is instructed. When the zoom motor 32 rotates, the zoom lens 21B moves, and the zoom operation is performed. Also, according to the present embodiment, a high quality movie image can be provided.

As described above, according to the image pickup device of the present invention, a decrease of an image signal output at the time of the incidence of a large quantity of light can be reduced and output variations of the pixels in the same row as that of the large light quantity pixel, which are read at the same time as the large light quantity pixel, can be reduced. And, by means of the above solution of the problem, the variation likely be caused in the image can be reduced. Thus, a high quality image can be provided.

In addition, any of the embodiments described above are only examples at the time of implementing the present invention, and the scope of the present invention should not be interpreted to be limited to the embodiments. For example, the configuration of a pixel and the configuration of a clip circuit are not limited to those of the embodiments. Moreover, the polarities of charges are indifferent, and the present invention can be also applied to the structure of the image pickup device in which voltage relations are inverse. That is, the present invention can be implemented in various forms without departing from the scope and the main features thereof.

This application claims priority from Japanese Patent Application Nos. 2005-169780 filed Jun. 9, 2005 and 2006-146796 filed May 26, 2006, which are hereby incorporated by reference herein.

What is claimed is:

1. A driving method of an image pickup device comprising:
a photoelectric conversion element;
a transfer gate for transferring a charge of the photoelectric conversion element;
a floating node to which the charge can be transferred by the transfer gate;
a first transistor for resetting a voltage of the floating node;
a second transistor comprised in a source follower circuit, and being capable of outputting a signal based on the voltage of the floating node;
a signal line for transmitting the signal outputted from the second transistor;
an A/D converter arranged correspondingly to the signal line, for converting the signal transmitted through the signal line into a digital signal; and
a current source comprised in the source follower circuit, wherein the method comprises:
a noise read out step for reading out the signal based on the voltage of the floating node reset by the first transistor;
a photoelectric conversion signal read out step for reading out a signal based on the charge of the photoelectric conversion element transferred by the transfer gate;
a first limiting step for limiting a voltage variation of the signal line within a first voltage; and
a second limiting step for limiting the voltage variation of the signal line within a second voltage different from the first voltage,
wherein the first limiting step is performed during at least a part of the noise read out step, and the second limiting step is performed during at least a part of the photoelectric conversion signal read out step.

2. The driving method according to claim 1, wherein in the first and second limiting steps, the limiting the voltage variation of the signal line is performed by a clip circuit.

3. The driving method according to claim 1, wherein the charge is an electron, and
the first voltage is higher than the second voltage.

4. The driving method according to claim 1, wherein an absolute value of a difference between the first voltage and the second voltage is larger than a saturation range of the A/D converter.

5. The driving method according to claim 1, wherein the first transistor capable of supplying a first reset voltage and a second reset voltage different from the first reset voltage to the floating node.

6. The driving method according to claim 1, further comprising:
   a step of holding the signal reading out in the noise read out step; and
   a step of holding the signal reading out in the photoelectric conversion signal read out step.

7. The driving method according to claim 2, wherein the clip circuit comprises a third transistor and a power source.

8. The driving method according to claim 7, wherein the second and third transistors are in the same size.

9. The driving method according to claim 7, wherein the second transistor is supplied with a voltage from a power source, and
   the power source of the clip circuit and the power source of the second transistor supply the same voltage.

10. A driving method of an imaging system, the image system comprising:
   an image pickup device comprising: a photoelectric conversion element; a transfer gate for transferring a charge of the photoelectric conversion element; a floating node to which the charge can be transferred by the transfer gate; a first transistor for resetting a voltage of the floating node; a second transistor comprised in a source follower circuit, and being capable of outputting a signal based on the voltage of the floating node; a signal line for transmitting the signal outputted from the second transistor; an A/D converter arranged correspondingly to the signal line, for converting the signal transmitted through the signal line into a digital signal; and a current source comprised in the source follower circuit; and
   a lens for focusing an optical image onto the image pickup device,
   wherein the method comprises:
   a noise read out step for reading out the signal based on the voltage of the floating node reset by the first transistor;
   a photoelectric conversion signal read out step for reading out a signal based on the charge of the photoelectric conversion element transferred by the transfer gate;
   a first limiting step for limiting a voltage variation of the signal line within a first voltage; and
   a second limiting step for limiting the voltage variation of the signal line within a second voltage different from the first voltage,
   wherein the first limiting step is performed during at least a part of the noise read out step, and the second limiting step is performed during at least a part of the photoelectric conversion signal read out step.

* * * * *